US010853669B2

(12) United States Patent
Mori (10) Patent No.: US 10,853,669 B2
(45) Date of Patent: Dec. 1, 2020

(54) OBJECT RECOGNITION DEVICE, OBJECT RECOGNITION METHOD AND SELF-DRIVING SYSTEM

(71) Applicant: Mitsubishi Electric Corporation, Tokyo (JP)

(72) Inventor: Masanori Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 15/623,650

(22) Filed: Jun. 15, 2017

(65) Prior Publication Data

US 2017/0372149 A1 Dec. 28, 2017

(30) Foreign Application Priority Data

Jun. 24, 2016 (JP) ................................ 2016-125160

(51) Int. Cl.
*G06K 9/00* (2006.01)
*G06K 9/62* (2006.01)
*G06T 7/277* (2017.01)

(52) U.S. Cl.
CPC ....... *G06K 9/00805* (2013.01); *G06K 9/6288* (2013.01); *G06K 9/6293* (2013.01); *G06T 7/277* (2017.01); *G06T 2207/30252* (2013.01)

(58) Field of Classification Search
CPC .. G05D 1/0088; G05D 1/021; G06K 9/00805; G06T 7/70
See application file for complete search history.

(56) References Cited

U.S. PATENT DOCUMENTS 7,460,951 B2 * 12/2008 Altan .................... G01S 13/726
701/536
8,818,702 B2 * 8/2014 Zeng ...................... G05D 1/024
701/300

(Continued)

FOREIGN PATENT DOCUMENTS

JP 5595181 B2 9/2014

OTHER PUBLICATIONS

Cho, Hyunggi, et al. "A multi-sensor fusion system for moving object detection and tracking in urban driving environments." Robotics and Automation (ICRA), 2014 IEEE International Conference on. IEEE, 2014. (Year: 2014).*

(Continued)

*Primary Examiner* — Avinash Yentrapati
(74) *Attorney, Agent, or Firm* — Sughrue Mion, PLLC; Richard C. Turner (57) ABSTRACT

An object recognition device 4 includes: a data reception unit 5 that creates observation data of respective sensors 1, 2 in accordance with sensor's detection data of an object in the surroundings of a host vehicle; an association processing unit 6 which, based on an association reference value, generates association data denoting a correspondence between the observation data and object data of a previous process cycle; and an updating processing unit 7 which, based on the association data, updates a state vector included in the object data of the previous process cycle, and updates the object data by including latest association data being the observation data having corresponded to the object data most recently, wherein the association processing unit 6 generates the association reference value using preferentially the latest association data of the same sensor as that of the observation data of a current process cycle.

8 Claims, 8 Drawing Sheets

(56) References Cited

U.S. PATENT DOCUMENTS

| | | | | |
|---|---|---|---|---|
| 8,954,272 | B2* | 2/2015 | Adam | G01S 13/726 |
| | | | | 701/519 |
| 9,823,344 | B2* | 11/2017 | Turner | G01S 13/726 |
| 10,054,678 | B2* | 8/2018 | Mei | G05D 1/0238 |
| 10,156,847 | B2* | 12/2018 | Iimura | G05D 1/0214 |
| 10,160,448 | B2* | 12/2018 | Liu | B60W 10/06 |
| 2005/0036658 | A1* | 2/2005 | Gibbins | G06T 7/277 |
| | | | | 382/103 |
| 2007/0073473 | A1* | 3/2007 | Altan | G01S 13/865 |
| | | | | 701/518 |
| 2007/0165967 | A1* | 7/2007 | Ando | G01S 17/86 |
| | | | | 382/291 |
| 2008/0300787 | A1* | 12/2008 | Zeng | G01S 7/4026 |
| | | | | 701/301 |
| 2010/0191391 | A1* | 7/2010 | Zeng | G08G 1/165 |
| | | | | 701/1 |
| 2011/0007942 | A1* | 1/2011 | Audet | G01S 17/66 |
| | | | | 382/103 |
| 2012/0219183 | A1* | 8/2012 | Mori | G06T 7/20 |
| | | | | 382/103 |
| 2014/0028457 | A1* | 1/2014 | Reinpoldt | G08B 13/2494 |
| | | | | 340/552 |
| 2014/0079282 | A1* | 3/2014 | Marcheselli | G07C 9/00 |
| | | | | 382/103 |
| 2014/0225919 | A1* | 8/2014 | Kaino | H04N 7/183 |
| | | | | 345/633 |
| 2016/0224850 | A1* | 8/2016 | Silver | G06K 9/6277 |
| 2018/0032824 | A1* | 2/2018 | Yamamoto | B60R 1/00 |
| 2018/0067488 | A1* | 3/2018 | Pollach | G05D 1/0088 |
| 2018/0126951 | A1* | 5/2018 | Ricci | B60R 25/2018 |
| 2018/0143298 | A1* | 5/2018 | Newman | B60W 30/08 |
| 2018/0259339 | A1* | 9/2018 | Johnson | G01S 15/87 |
| 2018/0267142 | A1* | 9/2018 | Motoyama | G08G 1/16 |
| 2019/0064810 | A1* | 2/2019 | Jiang | G05D 1/0055 |

OTHER PUBLICATIONS

Chavez-Garcia, Ricardo Omar, and Olivier Aycard. "Multiple sensor fusion and classification for moving object detection and tracking." IEEE Transactions on Intelligent Transportation Systems 17.2 (2016): 525-534. (Year: 2016).*

Hyunggi Cho et al., "A Multi-Sensor Fusion System for Moving Object Detection and Tracking in Urban Driving Environments", 2014 IEEE International Conference on Robotics & Automation (ICRA), Hong Kong Convention and Exhibition Center, pp. 1836-1843, May 31-Jun. 7, 2014, Hong Kong, China, 8 pages total.

Communication dated May 6, 2020, from the China National Intellectual Property Administration in Application No. 201710479934.1.

* cited by examiner

OBJECT RECOGNITION DEVICE, OBJECT RECOGNITION METHOD AND SELF-DRIVING SYSTEM

BACKGROUND OF THE INVENTION

1. Field of the Invention

The present invention relates to an object recognition device, an object recognition method and a self-driving system that integrate the detection data of an object received from a plurality of sensors installed in a host vehicle.

2. Description of the Related Art

Methods referred to as sensor fusion are known as methods that involve integrating and merging detection data from a plurality of sensors installed in a host vehicle. In sensor fusion, it is necessary to establish correspondences in terms of which detection data, among a plurality of detection data from respective sensors, are detection data of a same object.

In the object recognition device disclosed in Japanese Patent No. 5595181, a first sensor and a second sensor detect an object, respectively. Thereafter, the detection data of the first sensor is extrapolated according to a constant-velocity linear motion model, is time-adjusted to the detection time of the second sensor, and the degree of coincidence of the respective detection data having been time-adjusted is evaluated. Further, a bias error of the second sensor with respect to the first sensor is estimated while setting a motion model in which motion compensation is added to the detection data of the first sensor after time adjustment on the basis of the degree of coincidence the respective detection data. In this object recognition device, coordinate offset between the sensors is eliminated by correcting the bias error of the second sensor on the basis of the estimated bias error, thereby both detection data of the first sensor and the second sensor are recognized as data of a same object.

SUMMARY OF THE INVENTION

In the object recognition device disclosed in Japanese Patent No. 5595181, the installation status of the various sensors exhibits changes with time; accordingly, it is assumed that the origin of coordinates and the orientation of axes exhibit a given deviation, which is estimated as bias error. However, in cases where there are used sensors of different type, for instance a radio wave radar and an optical camera, the positions of the object, detected as of detection data the respective sensors, may exhibit deviations between sensors even if there is no coordinate offset between the sensors. This positional deviation is not constant, and varies depending on sensor type and for each object; moreover, the positional deviation increases with increasing distance. In a conventional object recognition device, this deviation could not be regarded as bias error, and hence a problem of misrecognition arose in that detection data of respective sensors for a same object was however misrecognized as detection data of different objects. Although this problem is prominent in sensors of different type, the problem occurs also among sensors that rely on the same detection method but have different resolution, for instance between an optical camera and another optical camera, and between a radio wave radar and another radio wave radar.

It is an object of the present invention, arrived at in order to solve the above problems, to increase object recognition precision and reduce the risk of object misrecognition.

The object recognition device of the present invention detects an object in the surroundings of a host vehicle using a plurality of sensors, and receives input of respective detection data constituting position information of the object from the sensors, the device including: a data reception unit that creates and outputs observation data of each sensor, in accordance with the detection data from the plurality of sensors; an association processing unit which, on the basis of an association reference value, works out association data denoting a correspondence between the observation data input from the data reception unit and object data of a previous process cycle, and outputs the observation data and the association data; and an updating processing unit which, on the basis of the association data output from the association processing unit, updates a state vector included in the object data of the previous process cycle and pertaining to the position information of the object, updates, for each sensor, the object data by including, in the object data, latest association data that is the observation data having corresponded to the object data most recently, from among the observation data, and outputs the updated object data, wherein the association processing unit works out the association reference value using preferentially the latest association data of the same sensor as that of the observation data of a current process cycle.

The present invention elicits the effect of making it possible to increase object recognition precision and reduce the risk of object misrecognition.

DESCRIPTION OF THE PREFERRED EMBODIMENTS

Embodiment 1

Figure 1:
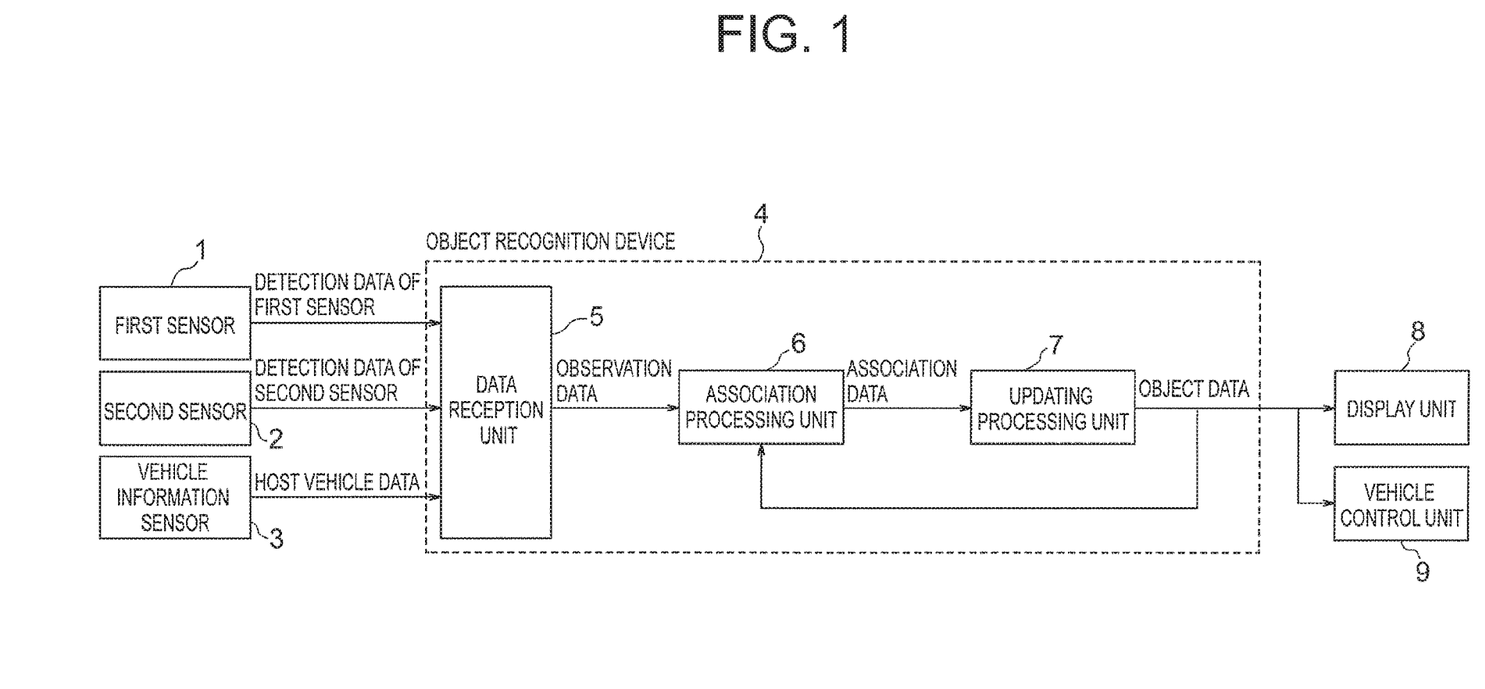
FIG. 1 is a block diagram illustrating the configuration of Embodiment 1 of the present invention.

Embodiment 1 of the present invention will be explained next with reference to accompanying drawings. FIG. 1 is a block diagram illustrating the configuration of a self-driving system that includes an object recognition device 4 in an embodiment of the present invention. The self-driving system in FIG. 1 is provided with a first sensor 1 and a second sensor 2, as a plurality of sensors, a vehicle information sensor 3, an object recognition device 4, such that a data reception unit 5, an association processing unit 6 and an updating processing unit 7 that are built into the object recognition device 4, as well as a display unit 8 and a vehicle control unit 9. The above system is installed in a vehicle. These structures will be explained in detail further on.

The first sensor 1 and the second sensor 2 receive for instance light or electromagnetic waves emitted or reflected by an object, and measure position information on an object in the surroundings of a host vehicle, for instance distance from the host vehicle up to the object, as well as bearing angle and relative speed with respect to the host vehicle. For instance, the first sensor 1 and the second sensor 2 may be a millimeter-wave radar, a laser radar, an ultrasonic sensor, an infrared sensor, an optical camera or the like.

It will be assumed that the mounting positions of the first sensor 1 and the second sensor 2 in the host vehicle and the range over which the object can be detected are all known. The mounting positions and so forth of the first sensor 1 and the second sensor 2 can be set arbitrarily. The recognition precision of the object recognition device 4 can be increased by integrating information on a same object into one information based on respective observation data of the object as detected by the first sensor 1 and the second sensor 2. Preferably, therefore, the detection ranges of the object for the first sensor 1 and the second sensor 2 overlap with each other (namely, there is a shared portion of detection ranges).

For objects that fail to be detected by either one of the first sensor 1 and the second sensor 2, the first sensor 1 and the second sensor 2 are preferably configured relying on different sensor schemes, in order to enable thus detection by the other sensor. The first sensor 1 and the second sensor 2 can have an overlapping detection range ahead of the host vehicle for instance by using a millimeter-wave radar as the first sensor 1 and using an optical camera as the second sensor 2, and installing the first sensor 1 in the middle of the front bumper of the host vehicle and the second sensor 2 behind the room mirror of the host vehicle. A plurality of objects belonging to the detection range are detected by these sensors. In the present invention it is particularly suitable to use such sensors of different type, but the invention can also be used in situations where for instance there are utilized sensors relying on a same detection method unit but having different resolutions.

Object position information measured by the first sensor 1 constitutes detection data of the first sensor. Object position information measured by the second sensor 2 constitutes detection data of the second sensor.

The vehicle information sensor 3 is a sensor that measures the state of the host vehicle for instance in terms of the speed of the host vehicle, wheel speed, steering angle, yaw rate and so forth. The vehicle information sensor 3 is alternatively a sensor that measures the latitude, longitude, and direction of travel of the host vehicle, using a GPS (Global Positioning System). The information on the host vehicle, acquired by the vehicle information sensor 3 and necessary for object recognition in the host vehicle surroundings, is collectively referred to as host vehicle data.

The object recognition device 4 has the data reception unit 5, the association processing unit 6 and the updating processing unit 7, and is realized for instance in the form of a CPU that executes a program stored in a memory, and in the form of a processing circuit such as a system LSI or the like. The data reception unit 5 receives detection data of the first sensor, from the first sensor 1, detection data of the second sensor, from the second sensor 2, and host vehicle data from the vehicle information sensor 3, processes as needed the respective detection data into observation data, and outputs the data to the association processing unit 6, for each predetermined process cycle.

The association processing unit 6 determines a correspondence between the observation data and below-described object data from the updating processing unit 7. Further, the association processing unit 6 outputs, to the updating processing unit 7, observation data, object data and association data summarizing a correspondence between the foregoing. Existence of a correspondence denotes herein that given observation data and given object data apply to one same object, or are associated to a high likelihood of that being the case.

The updating processing unit 7 updates and outputs the object data on the basis of the association data. The object data includes for instance a state vector of the object, for example the detected position, speed, acceleration and so forth of the object, a respective detection count of observation data of the first sensor 1 and the second sensor 2 and that is utilized for generating/updating the state vector, observation data having corresponded to the object data most recently (hereafter referred to as latest association data) from among the respective observation data of the first sensor 1 and the second sensor 2, the elapsed time since the data most recently corresponded to respective observation data of the first sensor 1 and the second sensor 2, and a loss count. A plurality of objects is detected by the first sensor 1 and the second sensor 2, and object data is created for each object.

The state vector of the object data is updated in accordance with a known method, for instance least squares, Kalman filtering, particle filtering or the like.

In the object data, a detection count of observation data of the first sensor 1 and a detection count of observation data of the second sensor 2 are defined as N1 and N2, respectively, while the elapsed time since the object data most recently corresponded to the observation data of the first sensor 1 and the observation data of the second sensor 2 are defined as $\Delta T1$ and $\Delta T2$, respectively.

Part of the entirety of the object data of the updating processing unit 7 is output to the display unit 8 made up for instance of an instrument panel inside the vehicle, or a head mount display, for the purpose of displaying sensor information for instance to the driver. Alternatively, part of the entirety of the object data is output to the vehicle control unit 9 made up of for instance a brake control device or a steering control device, and the vehicle control unit 9 utilizes this object data for performing control of maintaining the distance to other vehicles, control of maintaining the lane of the host vehicle, and control of automatically braking the host vehicle.

The operation in the present Embodiment 1 will be explained next with reference to FIG. 2 (FIG. 2A, FIG. 2B) through FIG. 5.

Figure 2A:
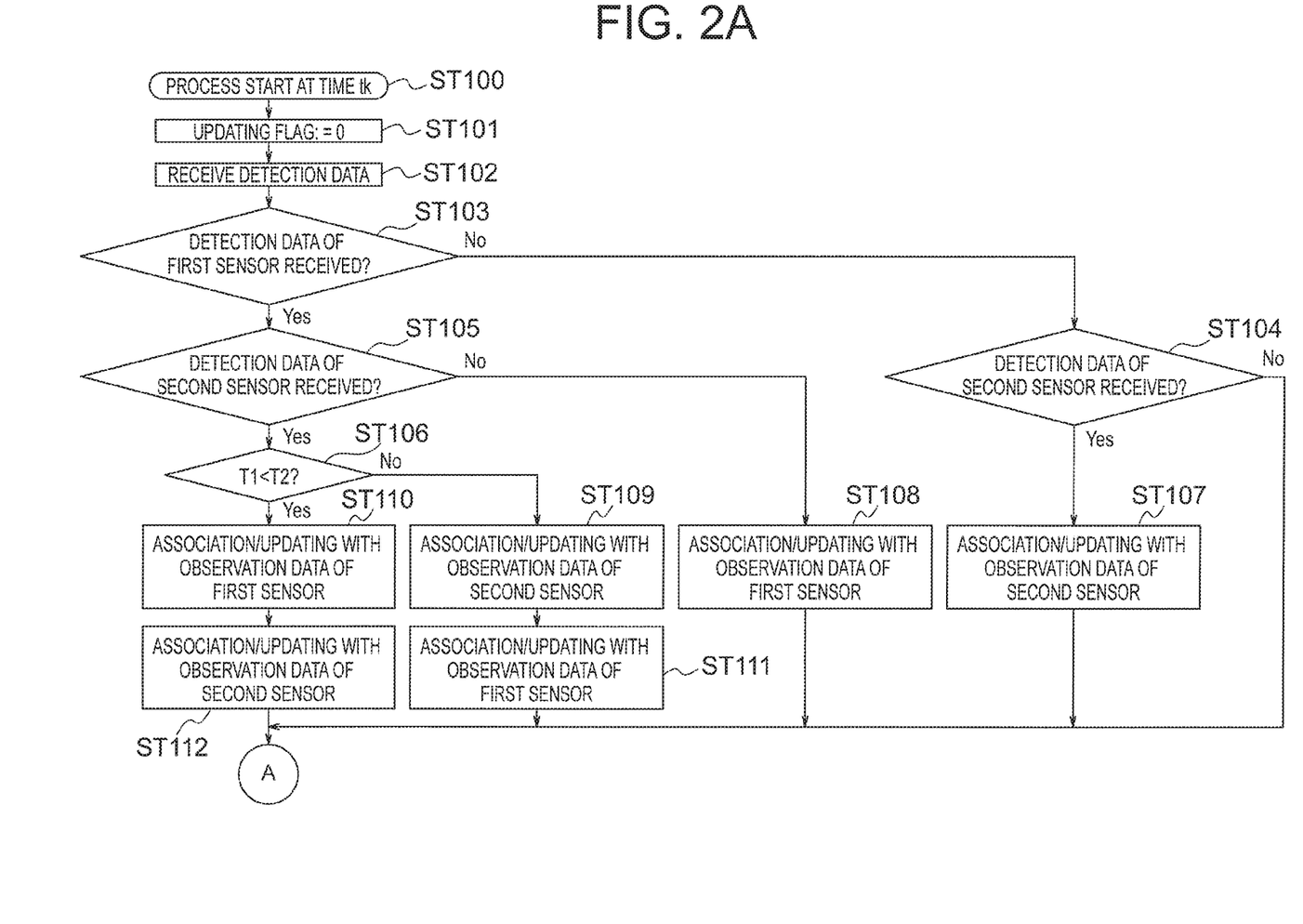
FIG. 2A is a flowchart (first half) illustrating the operation in Embodiment 1 of the present invention.
Figure 2B:
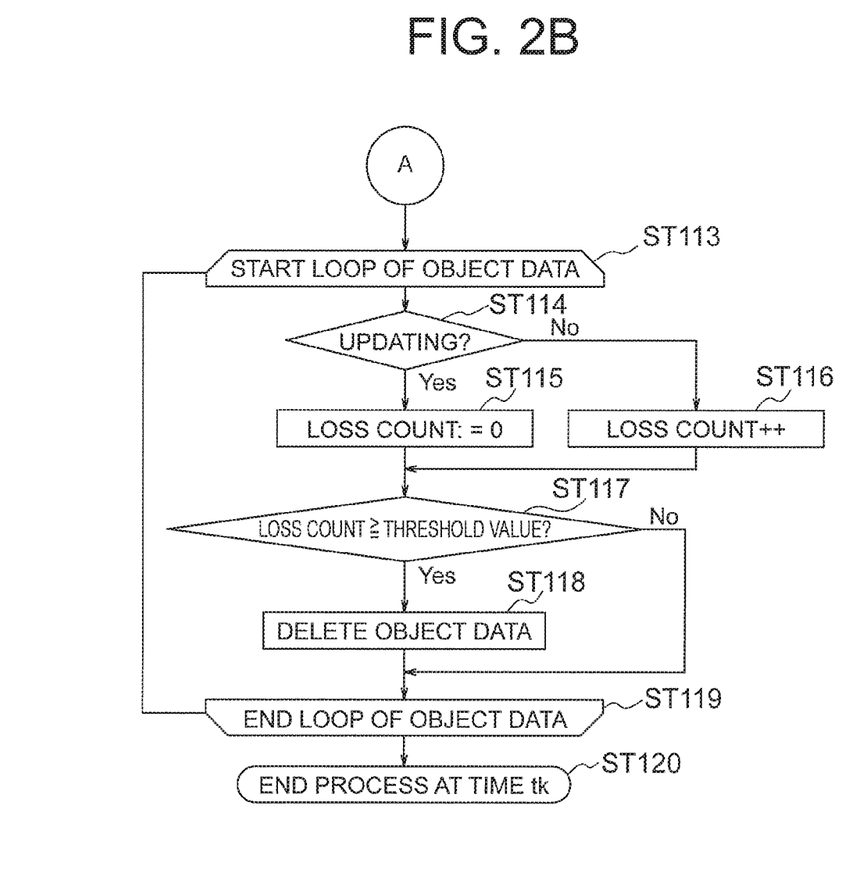
FIG. 2B is a flowchart (second half) illustrating the operation in Embodiment 1 of the present invention.

The object recognition device 4 repeatedly executes the operation below according to a predetermined operation cycle. FIG. 2 (FIG. 2A and FIG. 2B) illustrates an operation at a given process cycle tk (starting from time tk).

Firstly, the updating processing unit 7 sets to 0 an updating flag, for all object data (ST101). Next, the data reception unit 5 receives respective detection data from the first sensor 1 and the second sensor 2 (ST102). The data reception unit 5 receives host vehicle data from the vehicle information sensor 3. The detection data and the host vehicle data are received within a period lasting from a start time tk-1 of a process cycle tk-1, which is one cycle before the process cycle tk, up to the time tk.

Detection data is not received constantly from both the first sensor 1 and second sensor 2, and in some instances detection data is received from only one of the sensors, or from none.

The data reception unit 5 confirms, as a reception time, the point in time at which respective detection data is received. The reception times of the detection data from the first sensor 1 and the second sensor 2 will be referred to as T1 and T2, respectively. The reception times T1, T2 are represented by real numbers of points in time after the start time tk-1 of the process cycle tk-1, which is one cycle before the current process cycle tk, but prior to the start time tk of the process cycle tk.

Further, the data reception unit 5 processes, as needed, the detection data from the first sensor 1 or the second sensor 2, and the host vehicle data from the vehicle information sensor 3, to generate observation data for each sensor. In a case where, for instance, the relative speed of the object is included in the detection data, the ground speed of the object is worked out through a combination with the host vehicle speed included in the host vehicle data, to yield observation data. The detection data can be processed while mapped to the point in time at which the detection data is received, and can be expressed in the form of a vector quantity with a positive or negative sign. No observation data is generated in a case where the data reception unit 5 receives no detection data from the first sensor 1 or the second sensor 2.

After ST102 is over, the process proceeds to step (ST103) "detection data of the first sensor received?", and the data reception unit 5 determines whether reception of detection data from the first sensor 1 has been completed or not within the lapse from time tk-1 to time tk. If reception of detection data from the first sensor 1 is complete, the process yields Yes, and otherwise yields No. The process may yield No also in a case where reception of detection data from the first sensor 1 is complete but the content of the data is empty (all-invalid detection data).

If ST103 yields Yes, the process proceeds to step (ST105) "detection data of the second sensor received?", and similarly to the case of the first sensor 1, the data reception unit 5 determines whether reception of detection data from the second sensor 2 has been completed or not within the lapse from time tk-1 to time tk.

In a case where both steps (ST103, ST105) "detection data of the first sensor received?" and "detection data of the second sensor received?" yield Yes, the process proceeds to (step ST106) "T1<T2?".

In ST106 the data reception unit 5 compares the magnitude of the reception times T1, T2 from the first sensor 1 and the second sensor 2. If the reception time T1 is smaller than T2, i.e. if reception by the first sensor 1 occurred earlier, the process yields Yes; otherwise the process yields No.

If in ST106 there holds T1<T2, the data reception unit 5, the association processing unit 6 and the updating processing unit 7 execute sequentially step (ST110) "association/updating with the observation data of the first sensor" and step (ST112) "association/updating with the observation data of the second sensor". The detailed operations in each step are described below. Thereafter the process proceeds to ST113 described below.

If on the other hand T1<T2 does not hold, the data reception unit 5, the association processing unit 6 and the updating processing unit 7 execute sequentially step (ST109) "association/updating with the observation data of the second sensor", and step (ST111) "association/updating with the observation data of the first sensor". Thereafter the process proceeds to ST113 described below.

Thus, the data reception unit 5, the association processing unit 6 and the updating processing unit 7 process the received detection data on the basis of the order of reception times in the sensors 1 and 2.

If step (ST103) "detection data of the first sensor received?" yields Yes, and step (ST105) "detection data of the second sensor received?" yields No, the data reception unit 5, the association processing unit 6 and the updating processing unit 7 perform the operation of step (ST108) "association/updating with the observation data of the first sensor". Thereafter the process proceeds to ST113 described below.

If step (ST103) "detection data of the first sensor received?" yields No, and step (ST104) "detection data of the second sensor received?" yields Yes, the data reception unit 5, the association processing unit 6 and the updating processing unit 7 perform the operation of step (ST107) "association/updating with the observation data of the second sensor". Thereafter the process proceeds to ST113 described below.

If both steps (ST103, ST104) "detection data of the first sensor received?" and "detection data of the second sensor received?" yield No, the data reception unit 5, the association processing unit 6 and the updating processing unit 7 move onto ST113 described below without executing any process.

Next in step (ST113) "start loop of object data", the updating processing unit 7 selects one object data set not yet selected, from among all the stored object data, sets a selection state to already-selected, and moves onto step (ST114) "updating?". If all the object data is already-selected, the process proceeds to step (ST119) "end loop of object data", and the loop process of the object data is terminated.

In "updating?" step (ST114), the updating processing unit 7 determines whether an update flag for the selected object data is 1. If the update flag is 1, the process proceeds to step (ST115) "loss count:=0", and the loss count of the object data is reset to 0. Else, the updating processing unit 7 proceeds to step (ST116) "loss count++", and increments the loss count of the object data. Herein, the term loss denotes that the selected object data has not be updated in the current process cycle tk, i.e. that in the current process cycle tk there has been detected no object recognized as an object identical to the object having the selected object data.

Next, in step (ST117) "loss count threshold value?", the updating processing unit 7 determines whether the loss count of the selected object data is equal to or greater than a threshold value set beforehand. The threshold value is a natural number, and is for instance set to 3. If the loss count is equal to or greater than the threshold value, the process proceeds to step (ST118) "delete object data". If on the other hand the loss count is smaller than the threshold value, the process returns from step (ST119) "end loop of object data" to step (ST113) "start loop of object data", and moves onto selection of the next object data not yet selected.

In step (ST118) "delete object data", the updating processing unit 7 determines that the selected object data does not correspond to observation data of either the first sensor 1 or the second sensor 2, and that the object could not be detected by either sensor, and deletes the selected object data. After deletion, the process proceeds to "end loop of object data" step (ST119).

If through execution of the above loop process all the object data become selected, then the loop process of the object data is terminated, and the updating processing unit 7 outputs the updated object data to the association processing unit 6, the display unit 8 and the vehicle control unit 9, and ends the process at time tk. Even where all the object data fail to be updated, the object data output from the updating processing unit 7 is handled as updated object data.

Figure 3:
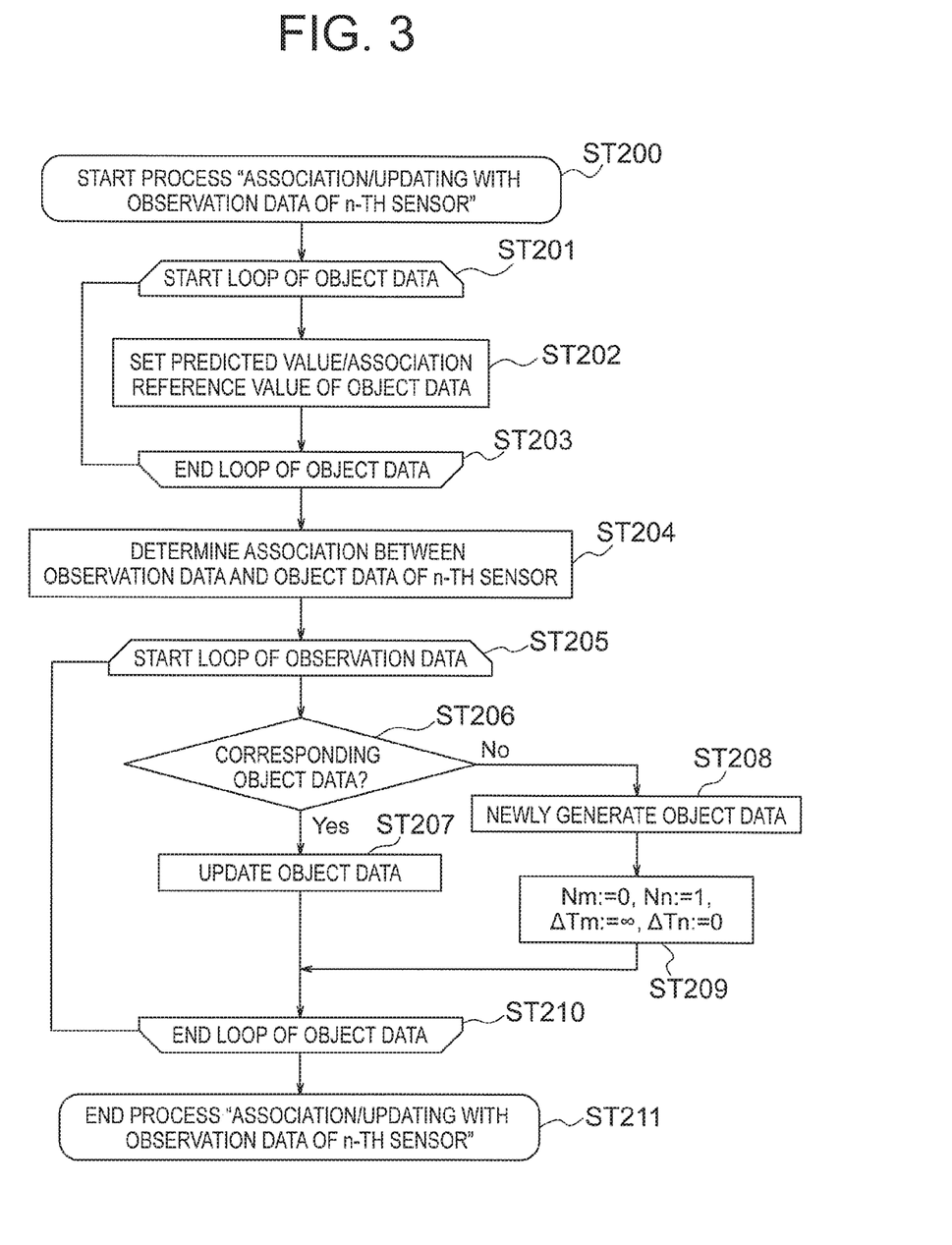
FIG. 3 is a flowchart illustrating the detailed operation of step (ST200) "association/updating with observation data of n-th sensor" in Embodiment 1 of the present invention.
Figure 4:
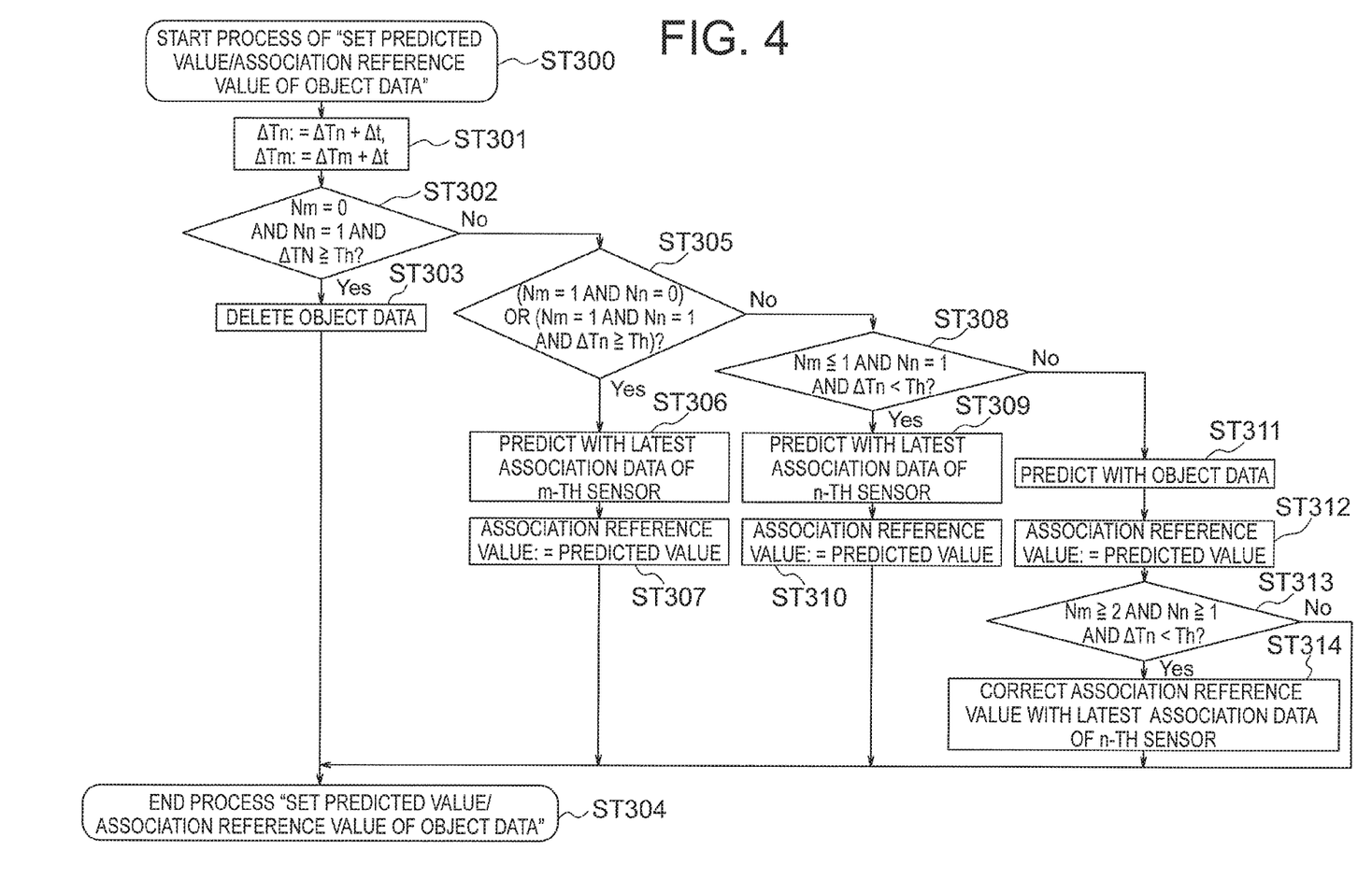
FIG. 4 is a flowchart illustrating the detailed operation of step (ST202) "set predicted value/association reference value of object data" in Embodiment 1 of the present invention.
Figure 5:
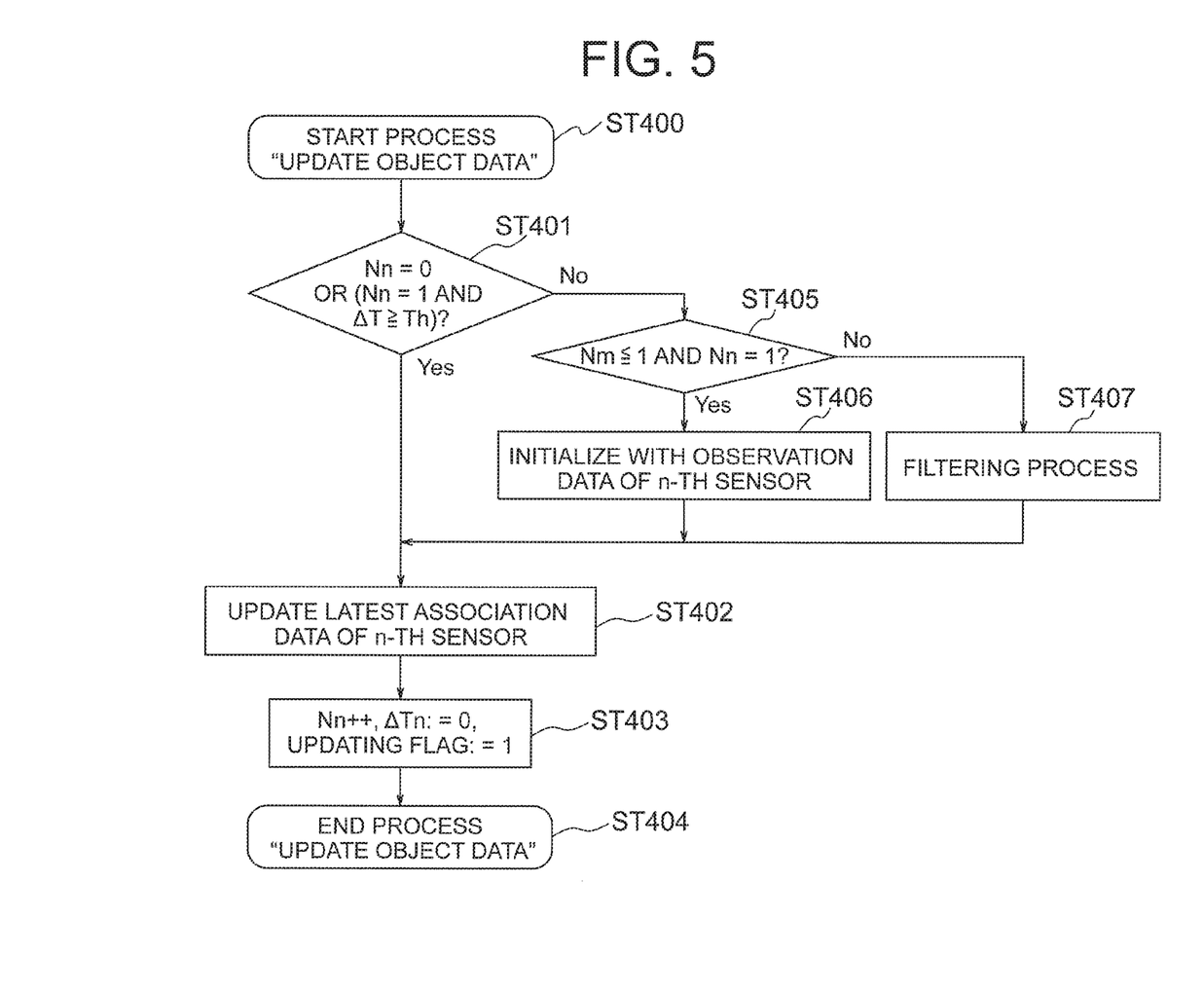
FIG. 5 is a flowchart illustrating the detailed operation of step (ST207) "update object data" in Embodiment 1 of the present invention.

The detailed operation of steps (ST108, 110, 111) "association/updating with the observation data of the first sensor" and of steps (ST107, 109, 112) "association/updating with the observation data of the second sensor" will be explained next with reference to FIG. 3. In the explanation of FIG. 3, FIG. 4 and FIG. 5 below, the object data used in the association processing unit 6 is object data of the process cycle tk-1, which is one cycle before the current process cycle tk. By contrast, the object data that is updated and output from the updating processing unit 7 constitutes object data of the current process cycle tk. This object data is used in the association processing unit 6, as object data of a previous process cycle, in the subsequent process cycle tk+1.

Herein steps (ST108, 110, 111) "association/updating with the observation data of the first sensor" and steps (ST107, 109, 112) "association/updating with the observation data of the second sensor" involve a contrasting operation between the first sensor 1 and the second sensor 2. Accordingly, in FIG. 3 there holds $n \in \{1,2\}$; $m \in \{1,2\} \setminus \{n\}$, and there will be explained a process that starts from step (ST200) "start process of 'association/updating with observation data of n-th sensor'".

In ST200, firstly, the process proceeds to step (ST201) "start loop of object data", whereupon the association processing unit 6 selects one object data set not yet selected, from among the plurality of object data input from the updating processing unit 7, sets the selection state to already-selected, and proceeds to step (ST202) "set predicted value/association reference value of object data". After setting, the process proceeds to step (ST203) "end loop of object data". The detailed operation of step (ST202) "set predicted value/association reference value of object data" will be described below.

If there is object data not yet selected, the process returns to step (ST201) "start loop of object data", and performs the same loop process. If all the object data have been selected, the loop process of the object data is terminated in step (ST203) "end loop of object data", and the process proceeds to step (ST204) "determine association between observation data and object data of n-th sensor".

Next, in step (ST204) "determine association between observation data and object data of n-th sensor", the association processing unit 6 determines a correspondence between the observation data of the n-th sensor input from the data reception unit 5 and the object data input from the updating processing unit 7, using the association reference value pertaining to the object data being the execution result of step (ST202) "set predicted value/association reference value of object data".

The association reference value is set by processing, as needed, a predicted value of the state vector of the current process cycle tk, as calculated from the state vector of a past process cycle and being included in the object data. Examples of the method for calculating the predicted value include for instance calculation methods according to predetermined motion conditions such as constant-velocity linear motion. The association reference value can be set to the same value as that of the predicted value, and can be set to a value corrected on the basis of the predicted value. The details involved are explained further on.

The correspondence between the observation data and the object data can be determined relying on for instance a known scheme. For instance, the association processing unit 6 assigns observation data that is closest to the association reference value that yields a predicted position of the object, from among the plurality of observation data of the n-th sensor lying within a given range (for instance within thrice an observation error standard deviation) from an association reference value pertaining to the object data. The observation data and the object data can be mapped to each other as a result. Such a correspondence can be also expressed to the effect that there is an association between the observation data and the object data. Thereafter, the association processing unit 6 outputs to the updating processing unit 7 the observation data and object data of the n-th sensor, as well as association data summarizing a correspondence between the foregoing.

When the process of step (ST204) "determine association between observation data and object data of n-th sensor" is over, the process proceeds to proceeds to step (ST205) "start loop of observation data", and the updating processing unit 7 selects one observation data set not yet selected from among the observation data of the n-th sensor, for association data having been input from the association processing unit 6, sets the selection state to already-selected, and proceeds to step (ST206) "corresponding object data?".

If all the observation data is already-selected, the process proceeds to step (ST210) "end loop of object data", and the loop process of the observation data is terminated. The process proceeds to step (ST210) "end loop of observation data" also after the end of the process of step (ST207) "update object data" and of step (ST209) "Nm:=0, Nn:=1, ΔTm:=∞, ΔTn:=0" described below, returns to step (ST205) "start loop of observation data" for the observation data not yet selected, and the loop process is executed.

In step (ST206) "corresponding object data?", the updating processing unit 7 determines whether object data corresponding the selected observation data is present in the association data input from the association processing unit 6. If object data corresponding to the selected observation data is present, the process proceeds to step (ST207) "update object data". Otherwise, the process proceeds to step (ST208) "newly generate object data". The detailed operation of step (ST207) "update object data" will be explained further on.

Having proceeded to step (ST208) "newly generate object data", there is thus no corresponding object data in the plurality of object data stored thus far, for the selected observation data, and hence the updating processing unit 7 determines that a new object has been detected by either one of the sensors 1 and 2, and generates new object data. The process proceeds to step (ST209) "Nm:=0, Nn:=1, ΔTm:=∞, ΔTn:=0", and for the generated new object data, a detection count Nn of the input observation data of the n-th sensor is set to 1, the elapsed time ΔTn since the new object data most recently corresponded to that data is set to 0, a detection count Nm of the observation data of the other m-th sensor is set to 0, and the elapsed time ΔTm since the new object data most recently corresponded to that data is set to infinity.

The detailed operation of step (ST202) "set predicted value/association reference value of object data" will be explained next with reference to FIG. 4.

Firstly, the process proceeds from step (ST300) "start process of 'set predicted value/association reference value of object data'" to step (ST301) "ΔTn:=ΔTn+Δt, ΔTm:=ΔTm+Δt", and the association processing unit 6 adds an elapsed time Δt since the operation of the previous step "association/updating with the observation data of n-th sensor" or "association/updating with the observation data of the m-th sensor" step, to the respective elapsed times ΔTn, ΔTm since the selected object data most recently corresponded to the observation data of the respective sensor. The elapsed time Δt is Δt=T2−T1 if, for instance, both step (ST103) "detection data of the first sensor received?" and step (ST105) "detection data of the second sensor received?" yield Yes, step (ST106) "T1<T2?" yields Yes, and step (ST112) of "association/updating with the observation data of the second sensor" is being currently executed.

After the process of ST301 is over, the process proceeds to step (ST302) "Nm=0 and Nn=1 and ΔTn≥Th?", and the association processing unit 6 determines, for the selected object data, whether the detection count Nm of the observation data of the m-th sensor is 0, the detection count Nn of the n-th sensor is 1, and the elapsed time ΔTn since the selected object data corresponded most recently to the observation data of the n-th sensor is equal to or greater than a threshold value Th established beforehand. If the above condition is satisfied, the process proceeds to step (ST303) "delete object data". The threshold value Th is for instance 1.5 times the sampling period of the n-th sensor.

In step (ST303) "delete object data" the association processing unit 6 determines that the observation data of the n-th sensor having corresponded to the object data most recently is an erroneous detection, given that the selected object data did not correspond again to the observation data of the n-th sensor, even though a given time or longer elapsed since the selected object data most recently corresponded to the observation data of the n-th sensor, deletes the selected object data, and proceeds to step (ST304) "end process 'set predicted value/association reference value of object data'", to end the process of the step "set predicted value/association reference value of object data".

If on the other hand ST302 yields No, the process proceeds to step (ST305) "(Nm=1 and Nn=0) or (Nm=1 and Nn=1 and ΔTn≥Th)?", and the association processing unit 6 determines whether or not the selected object data satisfies the condition in ST305. If the condition is satisfied, the process proceeds to step (ST306) "predict with latest association data of m-th sensor".

In step (ST306) "predict with latest association data of m-th sensor", the selected object data does not correspond to the observation data of the n-th sensor after having corresponded to the observation data of the m-th sensor, or a situation has persisted for a given or longer time since the selected object data corresponded once to the observation data of the n-th sensor, and hence the association processing unit 6, determines, in particular in the latter case, that the one-time corresponding observation data of the n-th sensor is an erroneous detection, and predicts the state vector of the current process cycle tk using the latest association data of the m-th sensor.

The process proceeds to step (ST307) "association reference value:=predicted value", and the predicted value of the state vector pertaining to the object data is set to the association reference value, after which the process proceeds to ST304, to end the process of step "set predicted value/association reference value of object data".

If on the other hand ST305 yields No, the process proceeds to step (ST308) "Nm≤1 and Nn=1 and ΔTn<Th?", and the association processing unit 6 determines whether or not the selected object data satisfies the condition in ST308. If the condition is satisfied, the process proceeds to step (ST309) "predict with latest association data of n-th sensor".

In step (ST309) "predict with latest association data of n-th sensor", the association processing unit 6 determines that the observation data of the n-th sensor having corresponded to the object data most recently is detected normally, given that the selected object data has corresponded at most once in the past to the observation data of the m-th sensor, and the elapsed time since the object data corresponded most recently to the observation data of the n-th sensor is equal to or smaller than the threshold value Th, and predicts the state vector of the current process cycle tk using the latest association data of the n-th sensor.

The process proceeds to step (ST310) "association reference value:=predicted value", and the predicted value of the state vector pertaining to the object data is set to an association reference value, after which the process proceeds to ST304, to end the process of step "set predicted value/association reference value of object data".

If ST308 yields No, the process proceeds to step (ST311) "predict with object data".

In step (ST311) "predict with object data", the association processing unit 6 newly calculates a predicted value of a state vector of the current process cycle tk, using a state vector of a past process cycle included in the selected object data.

Next, the process proceeds to step (ST312) "association reference value:=predicted value", and the predicted value of the state vector pertaining to the object data is set to the association reference value.

Next, the process proceeds to step (ST313) "Nm≥2 and Nn≥1 and ΔTn<Th?", and the association processing unit 6 determines whether or not the selected object data satisfies the condition in ST313. If the condition is satisfied, the process proceeds to step (ST314) "correct association reference value with latest association data of n-th sensor". Otherwise, the process proceeds to ST304, and ends the process of step "set predicted value/association reference value of object data".

In step (ST314) "correct association reference value with latest association data of n-th sensor", the association processing unit 6 corrects the association reference value pertaining to the selected object data using the latest association data of the n-th sensor, as described in detail below.

Generally, the deviation of the detection position of the observation data of the n-th sensor is not constant, and varies depending on the object and on the detection position; however, the change amount of the detected position deviation in the n-th sensor for a same object is small if the elapsed time since the previous observation is equal to or smaller than the threshold value Th. Accordingly, a detected position deviation amount is estimated based on the predicted value of the state vector pertaining to the object data and the latest association data of the n-th sensor, and the predicted value is corrected using the detected position deviation amount (δ described below), as a result of which it becomes possible to cancel the detected position deviation of the current observation data of the n-th sensor.

For instance t denotes herein the reception time of the observation data of the n-th sensor, position x_p(t) and speed v_p(t) denote the association reference value (i.e. predicted value of the state vector) pertaining to the selected object data, z_old denotes the position of the latest association data of the n-th sensor, t_old denotes the reception time of the latest association data of the n-th sensor, and the object is assumed to move according to constant-velocity linear motion. Such being the case, a tentative state vector (position x_p(t_old), speed v_p(t_old)) at time t_old are calculated virtually as given in Expression (1) below.

$$x\_p(t\_\text{old})=x\_p(t)+(t\_\text{old}-t)\times v\_p(t),\ v\_p(t\_\text{old})=v\_p(t) \quad (1)$$

The correction amount δ is given by Expression (2) as the difference with respect to the position z_old of the latest association data of the n-th sensor.

$$\delta = z\_\text{old} - x\_p(t\_\text{old}) \quad (2)$$

Therefore the position x_pp(t) and the speed v_pp(t) of the association reference value after correction pertaining to the object data are given by Expression (3) below.

$$x\_pp(t)=x\_p(t)+(z\_\text{old}-x\_p(t\_\text{old})),\ v\_pp(t)=v\_p(t) \quad (3)$$

In ST314, the association reference value is corrected thus, after which the process proceeds to ST304, to end the process of step "set predicted value/association reference value of object data".

An explanation follows next, with reference to FIG. 5, on the detailed operation of step (ST207) "update object data".

Firstly, the process moves from the process start step (ST400) "update object data" to step (ST401) "Nn=0 or (Nn=1 and ΔT≥Th)?", and the updating processing unit 7 determines whether or not the object data corresponding to the selected observation data satisfies the condition described in ST401. If the condition is satisfied, the object data corresponds for the first time to the observation data of the n-th sensor, or a situation has persisted for a period equal to or longer the threshold value Th since the object data corresponded once in the past to the observation data of the n-th sensor, and hence it is determined, in particular in the latter case, that the past corresponding observation data of the n-th sensor is an erroneous detection, and the process proceeds to step (ST402) "update latest association data of n-th sensor".

If on the other hand ST401 yields No, the process proceeds to step (ST405) "Nm≤1 and Nn=1?", and the updating processing unit 7 determines whether or not the object data corresponding to the selected observation data, satisfies the condition described in ST405. If this condition is satisfied, the process proceeds to step (ST406) "initialize with observation data of n-th sensor". Otherwise, the process proceeds to step (ST407) "filtering process".

In step (ST406) "initialize with observation data of n-th sensor", the updating processing unit 7 initializes the state vector for the object data corresponding to the selected observation data, using the latest association data of the n-th sensor and the selected observation data. For instance, z_old denotes herein the position in the latest association data of the n-th sensor for the object data, t_old denotes reception time, z denotes the position in the selected observation data, t denotes reception time, and the object is assumed to move according to constant-velocity linear motion. Such being the case, position x_s(t) and speed v_s(t) in the object data are given by Expression (4) below, for initialization of the state vector. The process proceeds to then to step (ST402) "update latest association data of n-th sensor".

$$x\_s(t)=z,\ v\_s(t)=(z-z\_\text{old})/(t-t\_\text{old}) \quad (4)$$

Meanwhile in step (ST407) "filtering process", the updating processing unit 7 updates the state vector using the selected observation data, for the object data corresponding to the selected observation data. The state vector can be updated in accordance with a known method, for instance least squares, Kalman filtering, particle filtering or the like, while adjusting the coefficients of the filter according to the error characteristic of the sensor that is used. The process proceeds to then to step (ST402) "update latest association data of n-th sensor". Both initialization and the filtering process are types of updating process of the state vector.

In step (ST402) "update latest association data of n-th sensor", the updating processing unit 7 sets the selected observation data as the latest association data of the n-th sensor, for the object data corresponding to the selected observation data. Thereafter, the process proceeds to ST403, the detection count Nn of the n-th sensor is incremented, the elapsed time ΔTn since the object data corresponded most recently to the observation data of the n-th sensor is set to 0, and the update flag is set to 1. Once setting is over, the process proceeds to step (ST404) "end process 'update object data'", and the updating process of the object data is terminated.

An explanation follows next on the concrete operation in the present Embodiment 1 with reference to schematic diagrams (FIG. 6 to FIG. 9) that illustrate the setting of the predicted value/association reference value in a situation in which there is input observation data from the first sensor 1 and the second sensor 2.

Figure 6:
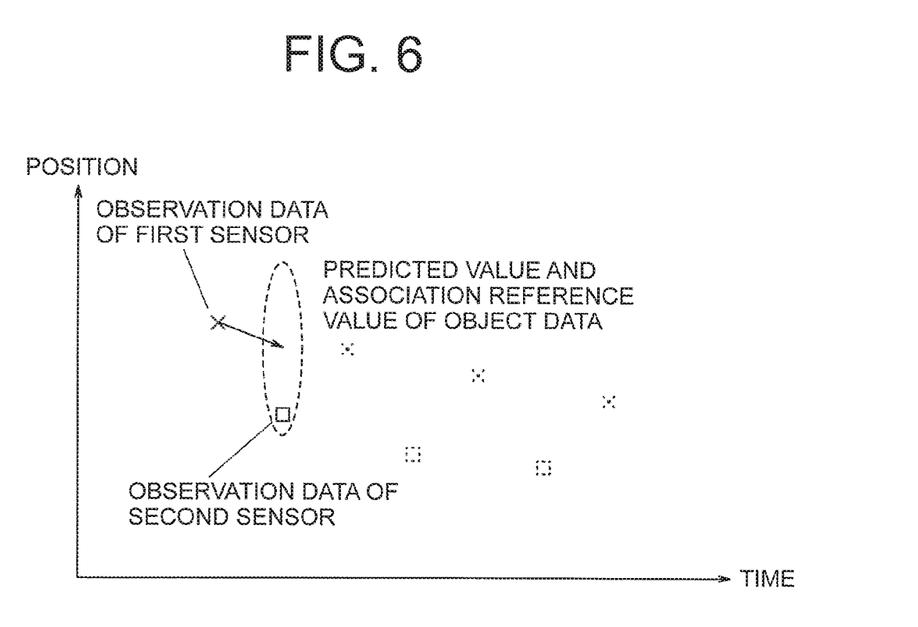
FIG. 6 is a schematic diagram illustrating settings of a predicted value/association reference value in a scenario in which observation data from a second sensor is newly input in a situation where a detection count N1 of a first sensor is 1 and a detection count N2 of the second sensor is 0, in Embodiment 1 of the present invention.

FIG. 6 illustrates a scenario in which observation data of the second sensor 2 is newly input, in a situation where N1=1; N2=0. This corresponds to the condition of step (ST305) "(N1=1 and N2=0) or (N1=1 and N2=1 and ΔT2≥Th?)" of FIG. 4, and hence the association reference value is worked out using the observation data of the first sensor 1. In further detail, the tip of the arrow having the observation data of the first sensor 1 as the origin is set to yield the predicted value (association reference value) of the state vector pertaining to the object data. The interior of the dotted ellipse denotes the range of observation data that can possibly correspond to the object data. The observation data of the second sensor 2 lies within this range, and hence it is determined that the object data and the observation data of the second sensor 2 correspond to each other.

Figure 7:
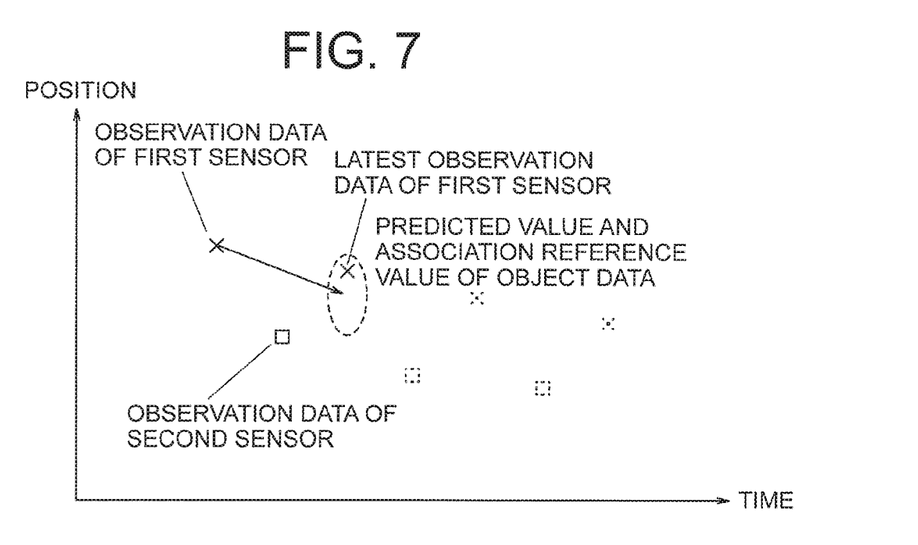
FIG. 7 is a schematic diagram illustrating settings of a predicted value/association reference value in a scenario in which observation data from a first sensor is newly input in a situation where a detection count N1 of the first sensor is 1 and a detection count N2 of a second sensor is 1, in Embodiment 1 of the present invention.

Next, FIG. 7 illustrates a scenario in which observation data of the first sensor is newly input after the scenario depicted in FIG. 6, i.e. in a situation where N1=1; N2=1. This corresponds to the condition of step (ST308) "N2≤1 and N1=1 and ΔT1<Th?" of FIG. 4, and hence the state vector of the object data is predicted using the latest association data of the first sensor 1, and the tip of the arrow having the observation data of the first sensor 1 as an origin is set to yield the predicted value (association reference value) of the state vector pertaining to the object data. The latest observation data of the first sensor 1 lies within the same range (within the dotted ellipse) as illustrated in FIG. 6, and hence it is determined that the object data and the latest observation data of the first sensor 1 correspond to each other. Although the observation data of the first sensor 1 and the observation data of the second sensor 2 are included in the object data, the data detected in the current process cycle is observation data of the first sensor 1 (latest observation data of the first sensor), and accordingly use of the observation data of the first sensor 1 is given priority, and the association reference value is worked out from the observation data of the first sensor 1.

This situation corresponds to the condition of step (ST405) "N2≤1 and N1=1?" of FIG. 5 upon updating of the object data, and hence the state vector of the object data is initialized using the observation data of the first sensor 1.

Figure 8:
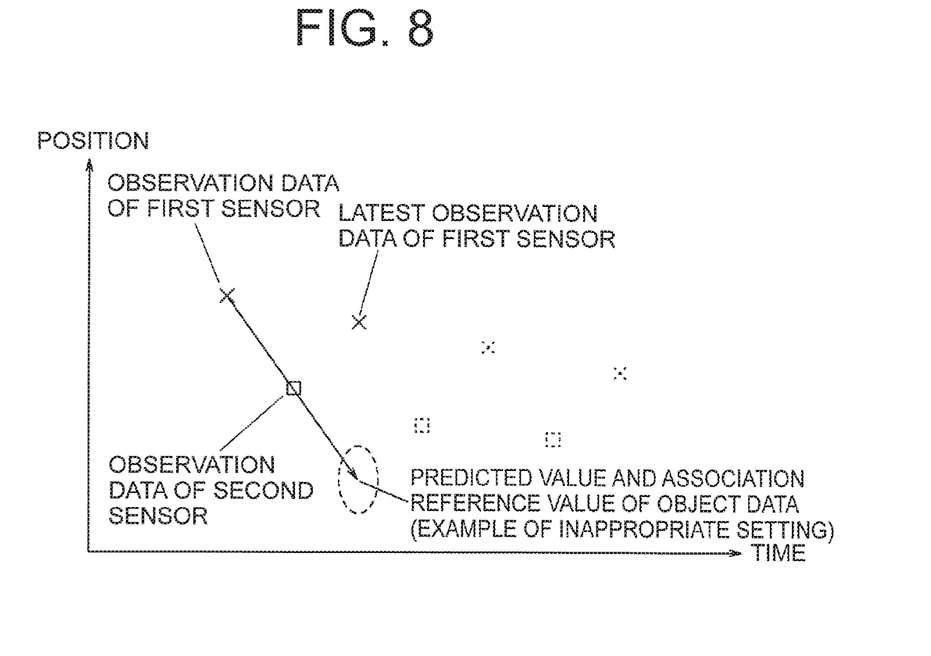
FIG. 8 is a schematic diagram (reference diagram) illustrating a setting example of an inappropriate predicted value/association reference value, for explaining the reasonableness of set predicted value/association reference value in the situation of FIG. 7, in Embodiment 1 of the present invention.

A reference example in a case where the object recognition device disclosed in the present Embodiment 1 is not utilized will be explained next with reference to FIG. 8. In FIG. 8 there is illustrated a method that involves setting for instance, as an association reference value and a predicted value of the state vector pertaining to the object data, the tip of an arrow that joins the observation data of the first sensor 1 and the observation data of the second sensor 2, as a method for setting an association reference value and predicted value of the state vector pertaining to the object data using hitherto corresponding observation data, regardless of the sensor (whether the first sensor 1 or the second sensor 2). When this method is resorted to, however, deviation in the detection positions of the observation data of the first sensor 1 and the observation data of the second sensor 2 gives rise, when the foregoing data are simply joined, to an increase in speed error due to the deviation in detection positions, such that the latest observation data of the first sensor 1 does not fall within the range (within the dotted ellipse) of observation data that can possibly correspond to the object data. A problem arises as a result in that object data cannot be recognized as an object, despite the fact that an object is detected that is already recorded as object data. This problem can be avoided by contrast in the present Embodiment 1; specifically it is possible to enhance the recognition precision of a sensor system as a whole through proper association of detection data and object data, also in cases where the deviation in detection data between sensors is not constant.

Figure 9:
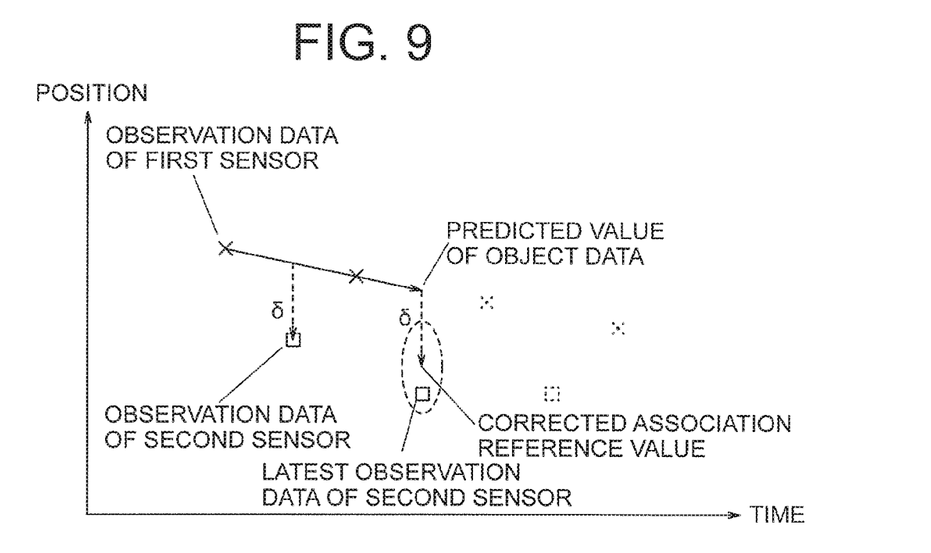
FIG. 9 is a schematic diagram illustrating settings of a predicted value/association reference value in a scenario in which observation data from a second sensor is newly input in a situation where a detection count N1 of a first sensor is 2 and a detection count N2 of the second sensor is 1, in Embodiment 1 of the present invention.

FIG. 9 illustrates a scenario in which observation data of the second sensor 2 is newly input after the scenario illustrated in FIG. 7, i.e. in a situation where N1=2; N2=1. This does not correspond to any of the conditions of step (ST302) "N1=0 and N2=1 and ΔT2≥Th?", or step (ST305) "(N1=1 and N2=0) or (N1=1 and N2=1 and ΔT2≥Th?", or step (ST308) "N1≤1 and N2=1 and ΔT2<Th?" illustrated in FIG. 4. Therefore, the process proceeds to ST311 and ST312, and for instance prediction is carried out using the state vector of the object, initialized with the observation data of the first sensor 1, and the tip of the solid line arrow is temporarily set as the predicted value (association reference value) of the state vector pertaining to the object data. If the association reference value remains uncorrected, there arises a deviation in the detection positions of the observation data of the first sensor 1 and the observation data of the second sensor 2; accordingly, the latest observation data of the second sensor 2 lies outside a range (dotted ellipse) of observation data that can possibly correspond to the object data, and hence it is determined that the object data and the latest observation data of the second sensor 2 do not correspond to each other.

This situation corresponds to the condition of step (ST313) "N1≥2 and N2≥1 and ΔT2<Th?" of FIG. 4, and hence the predicted value is corrected using the correction amount δ illustrated in FIG. 9, and the association reference value is newly set as a corrected association reference value. The details involved have been explained above regarding the process in ST314. The latest observation data of the second sensor 2 lies thus inside a range (dotted ellipse) of observation data that can possibly correspond to the object data, and hence it is determined that the object data and the latest observation data of the second sensor 2 correspond to each other.

In the process illustrated in FIG. 9 above, firstly there is calculated a predicted value of the state vector of the current process cycle, using the observation data of the first sensor 1, in a process of associating object data already recorded with observation data (latest observation data of the second sensor) of the current process cycle. Next, this predicted value is used to calculate a tentative state vector at the point in time at which the observation data of the second sensor 2 is received. Further, the predicted value is corrected on the basis of a correction amount in the form of the different amount between the actual observation data of the second sensor and the tentative state vector of the observation data, to work out a predicted value (corrected association reference value) of the state vector after correction. Thereafter, the possibility of correspondence between the object data and observation data of the current process cycle is determined using the corrected association reference value, and the object data is updated using the current associated observation data.

As a result of this correction there is increased the precision of determination of the possibility of correspondence to the effect that the observation data and the object data are deemed to apply to one same object, even if the deviation in detection data between sensors is not constant. Further, the recognition precision of the sensor system as a whole can be enhanced.

In the present Embodiment 1 an instance has been explained where two sensors are installed in the host vehicle, but a similar same effect is elicited in the case of three or more sensors.

For instance the vehicle control unit 9 controls a collision damage mitigation brake system that mitigates damage derived from a collision of the host vehicle against an object ahead, and controls an adaptive cruise control system for tracking vehicles ahead, using the object data obtained by the object recognition device 4 (for instance, information on the distance between the host vehicle and a surrounding object of the host vehicle, and on the position of the surrounding object). That is, the host vehicle can be self-driven by relying on for instance a collision damage mitigation brake system and an adaptive cruise control system, on the basis of a recognition result of the object from the object recognition device 4.

An overview of the object recognition device 4 of the present Embodiment 1 described above can be summarized as follows.

In the object recognition device 4 of the present Embodiment 1, an object in the host vehicle surroundings is received and detected by a plurality of sensors 1, 2, and detection data (object position information) is input from the sensors 1, 2.

The data reception unit 5, being one structure of the object recognition device 4, receives the input of detection data from the plurality of sensors 1, 2. The data reception unit 5 creates and outputs observation data for each of the first sensor 1 and the second sensor 2, in accordance with the detection data. More specifically, the data reception unit 5 receives the input of host vehicle data (host vehicle information necessary for object recognition in the host vehicle surroundings) from the vehicle information sensor 3, processes as needed the detection data and the host vehicle data, and outputs to the association processing unit 6, at preset cycles, the result in the form of observation data for each of the first sensor 1 and the second sensor 2.

On the basis of the association reference value, the association processing unit 6, being one of the structures of the object recognition device 4, works out association data denoting the correspondence between the observation data input from the data reception unit 5 and object data of a previous process cycle. The association processing unit 6 outputs at least observation data and association data to the updating processing unit 7. More specifically, object data is created on the basis of observation data input in a past process cycle, and includes related information such as object position information detected by the first sensor 1 or the second sensor 2. Object data is created anew for an object that is detected for the first time. Association data is herein data denoting a correspondence in terms of whether the observation data and the object data are of a same object or not.

The updating processing unit 7, being one structure of the object recognition device 4, updates the state vector included in the object data of the previous process cycle on the basis of the association data input from the association processing unit 6. The updating processing unit 7 updates the object data by including latest association data in the respective object data of each sensor 1, 2. The updating processing unit 7 outputs the updated object data to the association processing unit 6, the display unit 8 or the vehicle control unit 9. More specifically, the state vector is created on the basis of object position information (position, speed and so forth). The latest association data is observation data that corresponds to (is associated to) the object data most recently, among the observation data.

The association processing unit 6 works out the association reference value using preferentially the latest association data of the same sensor 1, 2 as that of the observation data of the current process cycle. More specifically, the association processing unit 6 works out a association reference value using the latest association data of the first sensor 1 in a case where in the current process cycle there is input observation data from the first sensor 1, in a situation where respective latest association data of the first sensor 1 and the second sensor 2 is stored in the object data. The association reference value may be expressed as a predicted value resulting from prediction of position information (state vector) in a current process cycle, for an object detected in a past process cycle. Alternatively, the association reference value may be expressed as a corrected predicted value which is obtained by correcting the predicted value.

Further, the association processing unit 6 goes back to a point in time at which the sensors 1, 2 have received observation data corresponding to the object data in a past process cycle, and calculates a tentative state vector at the point in time, using the predicted value of the state vector of the current process cycle. The association processing unit 6 can set, as an association reference value in the current process cycle, the result of correcting a predicted value using a correction amount in the form of the difference between the tentative state vector and corresponding observation data in the past. The operation herein is based on the process from ST311 to ST314.

When a detection count of observation data of the sensors 1, 2 corresponding to the object data in a past process cycle is equal to or smaller than an integer established beforehand for each sensor 1, 2, the association processing unit 6 can switch, in accordance with that detection count, the sensor 1, 2 that is used in order to work out the predicted value of the state vector of the current process cycle. Specifically, a configuration can be adopted such that when the number of times that, for a given object, object data and observation data of the sensors 1, 2 are associated as being deemed to apply to a same object is equal to or smaller than a set integer, there is switched between using the observation data of the first sensor 1 or using the observation data of the second sensor 2, in accordance with this number of times.

As a result, it becomes possible to select more properly the sensor used for observation data, immediately after start of direction of a given object, and to further enhance the recognition precision of the sensor system as a whole.

The present invention has been explained thus far in the form of the object recognition device 4, but the invention is not limited to the configuration or operation of the embodiments explained above, which can accommodate variations and omissions, as appropriate, within the scope of the invention. The present invention is realized also as an object recognition method, as described below.

In a first step, an object in the surroundings of the host vehicle is received and detected by the plurality of sensors 1, 2, and respective detection data constituting object position information is input from the sensors 1, 2.

In a second step, observation data for each sensor 1, 2 is created and output in accordance with the detection data from the plurality of sensors 1, 2.

In a third step, association data denoting a correspondence between observation data output in the second step and object data of a previous process cycle is worked out on the basis of an association reference value. In addition, there is output at least the observation data and the association data.

In a fourth step, a state vector included in the object data of a previous process cycle and pertaining to the object position information, is updated on the basis of the association data output in the third step. Furthermore, the object data of each sensor is updated by including, in the object data, latest association data that is the observation data having corresponded to the object data most recently, from among the observation data. The object data thus updated is output.

In the third step there is further worked out the association reference value using preferentially the latest association data of the same sensor as that of the observation data of the current process cycle.

The present invention is not realized only in the form of an object recognition device or an object recognition method, but also in the form of a self-driving system, as described below.

The self-driving system of the present Embodiment 1 detects an object in the surroundings of a host vehicle, using the plurality of sensors 1, 2, such that respective detection data constituting object position information is input to the self-driving system from the sensors 1, 2.

The data reception unit 5, being one structure of the self-driving system, creates and outputs observation data for each sensor 1, 2, in accordance with the detection data from the plurality of sensors 1, 2.

On the basis of the association reference value, the association processing unit 6, being one structure of the self-driving system, works out association data denoting a correspondence between the observation data input from the data reception unit 5 and object data of a previous process cycle. Further, the association processing unit 6 outputs at least the observation data and the association data.

On the basis of the association data input from the association processing unit 6, the updating processing unit 7, being one structure of the self-driving system, updates a state vector pertaining to object position information and being included in the object data of the previous process cycle. Further, the updating processing unit 7 updates, for each sensor 1, 2, the object data by including, in the object data, latest association data that is the observation data having corresponded to the object data most recently, from among the observation data. The object data thus updated is output.

The vehicle control unit 9, being one structure of the self-driving system, controls the operation of the host vehicle on the basis of the updated object data input from the updating processing unit 7.

The association processing unit 6 works out the association reference value using preferentially the latest association data of the same sensor as that of the observation data of the current process cycle.

INDUSTRIAL APPLICABILITY

As described above, the present invention affords higher object recognition precision than in conventional art, and hence is suitable for object recognition devices, object recognition methods and self-driving systems for object recognition.

What is claimed is:

1. An object recognition device that detects an object in surroundings of a host vehicle using a plurality of sensors, and receives input of respective detection data constituting position information of the object from the plurality of sensors, the object recognition device comprising at least one processor comprising:
   a data reception unit that creates and outputs observation data of each sensor, in accordance with the detection data from the plurality of sensors;
   an association processing unit which, based on an association reference value, processes association data denoting a correspondence between the observation data input from the data reception unit and object data of a previous process cycle, and outputs the observation data and the association data; and
   an updating processing unit which, based on the association data input from the association processing unit, updates a state vector included in the object data of the previous process cycle and pertaining to the position information of the object, updates, for each sensor, the object data by including, in the object data, an elapsed time that has passed since the observation data corresponded to the object data most recently, a number of times that the observation data is detected for each sensor, and latest association data that is the observation data having corresponded to the object data most recently, from among the observation data, and outputs the updated object data,
   wherein the association processing unit processes the association reference value using the latest association data of the same sensor as that of the observation data of a current process cycle, and
   wherein the updating processing unit deletes the object data based on determining that the number of times that there has been detected no object that corresponds to the object data in the current process cycle is greater than or equal to a predetermined threshold value.

2. The object recognition device according to claim 1, wherein the association processing unit goes back to a point in time at which the observation data corresponding to the object data in the previous process cycle is received, and calculates a tentative state vector at the point in time, using a predicted value of the state vector of the current process cycle, and sets, as the association reference value, a value resulting from correcting the predicted value using a correction amount in the form of a difference between the tentative state vector and the observation data at the point in time.

3. The object recognition device according to claim 1, wherein a detection count of the observation data for each sensor denotes the number of times that the observation data is detected for each sensor, and
   wherein when the detection count corresponding to the object data in the previous process cycle is equal to or smaller than an integer established beforehand for each sensor, the association processing unit switches, in accordance with the detection count, the sensor that is used in order to process the predicted value of the state vector.

4. The object recognition device according to claim 1, wherein at least one of the plurality of sensors has a type different from a type of the other sensors.

5. An object recognition method, comprising:
   a first step of detecting an object in surroundings of a host vehicle using a plurality of sensors, and receiving input of respective detection data constituting position information of the object from the plurality of sensors;
   a second step of creating and outputting observation data of each sensor, in accordance with the detection data from the plurality of sensors;
   a third step of, based on an association reference value, working out association data denoting a correspondence between the observation data output in the second step and object data of a previous process cycle, and outputting the observation data and the association data; and
   a fourth step of, based on the association data output in the third step, updating a state vector included in the object data of the previous process cycle and pertaining to the position information of the object, updating, for each sensor, the object data by including, in the object data, an elapsed time that has passed since the observation data corresponded to the object data most recently, a number of times that the observation data is detected for each sensor, and latest association data that is the observation data having corresponded to the object data most recently, from among the observation data, and outputting the updated object data,
   wherein, in the third step, the association reference value is worked out using the latest association data of the same sensor as that of the observation data of a current process cycle, and
   wherein, in the fourth step, the object data is deleted based on determining that the number of times that there has been detected no object that corresponds to the object data in the current process cycle is greater than or equal to a predetermine threshold value.

6. A self-driving system that detects an object in surroundings of a host vehicle using a plurality of sensors, and receives input of respective detection data constituting position information of the object from the sensors, the self-driving system comprising at least one processor comprising:
   a data reception unit that creates and outputs observation data of each sensor, in accordance with the detection data from the plurality of sensors;
   an association processing unit which, based on an association reference value, works out association data denoting a correspondence between the observation data input from the data reception unit and object data of a previous process cycle, and outputs the observation data and the association data;

an updating processing unit which, based on the association data input from the association processing unit, updates a state vector included in the object data of the previous process cycle and pertaining to the position information of the object, updates, for each sensor, the object data by including, in the object data, an elapsed time that has passed since the observation data corresponded to the object data most recently, a number of times that the observation data is detected for each sensor, and latest association data that is the observation data having corresponded to the object data most recently, from among the observation data, and outputs the updated object data; and a vehicle control unit that controls the host vehicle based on the updated object data input from the updating processing unit, wherein the association processing unit works out the association reference value using the latest association data of the same sensor as that of the observation data of a current process cycle, and wherein the updating processing unit deletes the object data based on determining that the number of times that there has been detected no object that corresponds to the object data in the current process cycle is greater than or equal to a predetermine threshold value.

7. The object recognition device according to claim 1,
wherein the plurality of sensors comprise a first sensor and a second sensor, and wherein the updating processing unit deletes the object data based on determining that the number of times the observation data detected by the first sensor is zero, the number of times the observation data detected by the second sensor is one, and the elapsed time that has passed since the observation data corresponded most recently to the object data of the second sensor is greater than or equal to another predetermined threshold value.

8. The object recognition device according to claim 1,
wherein the plurality of sensors comprise a first sensor and a second sensor, wherein the data reception unit determines a first reception time at which the detection data is received from the first sensor, and a second reception time at which the detection data is received from the second sensor, and wherein the updating processing unit updates the state vector included in the object data using the detection data of the first sensor and then using the detection data of the second sensor, in response to the first reception time is earlier than the second reception time, and updates the state vector included in the object data using the detection data of the second sensor and then using the detection data of the second sensor, in response to the second reception time is earlier than the first reception time.

* * * * *